US007282264B2

(12) United States Patent
Ddamulira et al.

(10) Patent No.: US 7,282,264 B2
(45) Date of Patent: Oct. 16, 2007

(54) COMPOSITION AND METHOD FOR CONTROLLING MOISTURE

(75) Inventors: Robert Kintu Ddamulira, Chattanooga, TN (US); John Edmund Raidy, Jr., Pasadena, CA (US); Barry Kenneth Wright, Rosewell, GA (US)

(73) Assignee: W.F. Taylor Co., Inc., Fontana, CA (US)

( * ) Notice: Subject to any disclaimer, the term of this patent is extended or adjusted under 35 U.S.C. 154(b) by 265 days.

(21) Appl. No.: 10/962,120

(22) Filed: Oct. 8, 2004

(65) Prior Publication Data

US 2006/0080935 A1    Apr. 20, 2006

(51) Int. Cl.
*C09D 5/00*     (2006.01)
*C09D 4/00*     (2006.01)
(52) U.S. Cl. ............... 428/403; 428/404; 428/331; 428/407; 106/454; 106/481; 106/482
(58) Field of Classification Search .......... 52/323–325, 52/331, 389, 384, 309.1, 390, 391, 309.14; 106/415, 454, 481, 482; 428/403–404, 331, 428/407
See application file for complete search history.

(56) References Cited

U.S. PATENT DOCUMENTS

| 4,562,225 A | 12/1985 | Huber et al. |
| 4,626,575 A | 12/1986 | Goel |
| 5,322,909 A | 6/1994 | Rankl et al. |
| 5,480,947 A * | 1/1996 | Oishi et al. .................. 525/509 |
| 5,919,851 A * | 7/1999 | Yamaguchi et al. ......... 524/268 |
| 6,359,030 B1 * | 3/2002 | Tsuda et al. ................. 523/201 |
| 6,706,789 B2 | 3/2004 | Ddamulira et al. |
| 6,890,643 B2 * | 5/2005 | Terase et al. ................ 428/323 |
| 7,008,990 B2 * | 3/2006 | Raether et al. .............. 524/457 |

FOREIGN PATENT DOCUMENTS

| EP | 0385747 A | 9/1990 |
| EP | 0534322 A | 3/1993 |

OTHER PUBLICATIONS

European Search Report, dated Dec. 10, 2004, for Application EP 02 73 4005.
H.W. Brewer; "Moisture Migration—Concrete Slab-on-Ground Construction"; Journal of the PCA Research and Development Laboratories vol. 7, No. 2, 2-17 (May 1965).
"Curing Methods and Materials" http://www.cement.ca/cement.nsf/searchFinal/A55048039A5B5A 08852568AA007D5C45?OpenDocument.
Jorrit Dirk Jan Van Den Berg "Analytical chemical studies on traditional linseed oil paints"; 2002.

(Continued)

*Primary Examiner*—Jeanette Chapman
(74) *Attorney, Agent, or Firm*—Stroock & Stroock & Lavan LLP

(57) ABSTRACT

A composition and method which exhibits enhanced moisture sealing properties, suitable for use with flooring materials, such as concrete, and flooring installations, such as carpeting, wood, tiles, etc. are provided. The composition is preferably non-water-based and can form a non-aqueous barrier coating on the flooring substrate, and most preferably provides a desirable pH and blocks migration of alkaline salts through the substrate.

41 Claims, 3 Drawing Sheets

OTHER PUBLICATIONS

"Chapter 2 Oil paint: developmental stages from an oil to a hard dry film"; http://www.amolf.nl/publications/theses/berg/h2.pdf.

W.H. Canty, G.K. Wheeler, R.R. Myers; "Drier Catalyst Activity in Organic Coatings"; http://www.rtvanderbilt.com/Drier%20Catalyst%20Activity%20in%20Organic%20Coatings%201.pdf.

"Indoor Air Facts No. 4 (revised): Sick Building Syndrome (SBS)"; http://www.epa.gov/iaq/pubs/sbs.html.

International Search Report in International Patent Application No. PCT/US2005/05075, mailed Oct. 20, 2006.

* cited by examiner

○ ESTER BOND
▶ ACID GROUP (−)
● CROSS LINKING SITE
Ⓜ METAL CATION (+)
— OH HYDROXYL GROUP

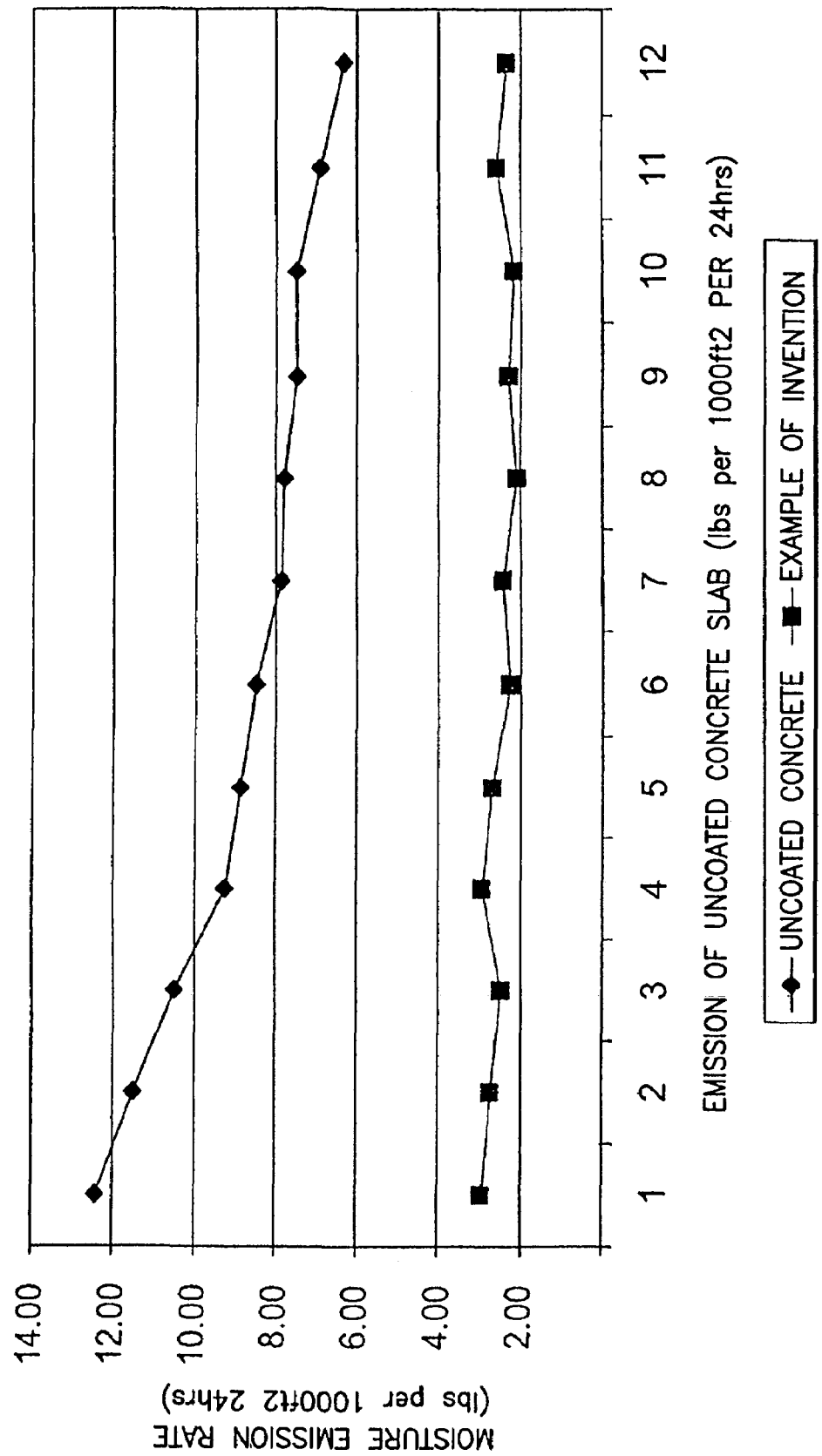

COMPOSITION AND METHOD FOR CONTROLLING MOISTURE

BACKGROUND OF THE INVENTION

The invention relates generally to a composition and a method for controlling moisture in surface material, such as flooring, and more particularly to a moisture sealer for concrete slabs, especially those acting as flooring substrates.

Moisture emission, such as concrete moisture emission, can cause problems with many floor covering materials and adhesive systems. For example, excessive moisture emission can cause distress or failure in modern floor coverings and resinous coating systems. This phenomenon has been intensified in the recent past, perhaps by changes in floor covering adhesives and coatings, which are more sensitive to moisture and alkali attacks, or by modern fast track construction schedules, which do not provide sufficient time for concrete slabs to dry before they are covered.

One potential problem caused by excessive moisture emission is the lifting and/or separating of the flooring installation, for example, bubbling or peeling, which would require replacement. The cost of replacing the flooring installation can be costly. Moreover, it can be particularly costly to vacate a floor after move-in, especially if business must be suspended during the replacement, causing a loss in revenue that often far exceeds the value of the flooring. Failure to replace the lifted/separated flooring is not only unsightly, it can cause injury to a person who may trip or slip on the lifted/separated flooring.

Other concerns raised by moisture emission include Sick Building Syndrome (SBS), as well as other Indoor Air Quality (IAQ) issues. SBS refers to health and comfort problems suffered by building occupants, when no specific illness or cause can be identified, that appear to be related to time spent in a building. SBS can be specific to a particular room, or it may be widespread throughout a building. SBS, as well as other IAQ issues, often are related to the floor surface, such as contaminants present in the floor surface that are intensified by the high sustained humidity levels created by unacceptably high moisture emission.

There are at least four potential sources of moisture in a flooring substrate. First, the source can be the substrate itself. Certain flooring substrates, such as concrete, require a long period of time for adequate moisture evaporation. This long drying period can be difficult to obtain because of strict construction schedules. One generally accepted "rule of thumb" practice is one month of drying per inch of slab thickness under ideal conditions. The ideal conditions are a minimum temperature of 70° F., maximum 30% humidity and constant air movement at 15 m.p.h. Even under ideal conditions, the standard can change according to the mix design water/cement ratio. In 1965, in a study entitled, "Moisture Migration—Concrete Slab-On-Ground Construction", H. W. Brewer, incorporated by reference, tracked moisture outflow of concrete as it dried. In the study, he showed that high water/cement ratio concrete took longer to achieve low level moisture emission than drier mix designs having lower water/cement ratios. Accordingly, it is preferable to use concrete slabs having a water/cement ratio of between 0.45 and 0.50 if the slab ages are 6 months of less.

A second potential moisture source is water that becomes added to the surface after installation, either during the drying process or even several years after the substrate has been placed. Examples of such water include rainwater during construction, flooding, fire sprinkler systems that malfunction, burst pipes, etc. These sources can render the slab unacceptable as a flooring substrate for the installation of floor coverings without undue drying times and/or considerable efforts with dehumidifiers, desiccants and the use of voluminous airflow.

A third potential source of moisture is the "blotter" course laid beneath the slab and over the top of a vapor retarder. The moisture in the blotter course transmits vapor into the slab, which can lead to excessive moisture emission.

A fourth potential source of moisture can be very troublesome in older building while also impacting newer buildings. This fourth source is moisture naturally available in the earth or added through irrigation and drainage under the slabs. This is often the largest source of transmitted moisture if it is not adequately prevented from reaching the slab.

Whereas there are various potential sources of water and it is common knowledge to those skilled in the art of applying flooring to concrete slabs that sufficient time is needed in order to achieve adequate evaporation and drying of the slabs, providing sufficient drying time is not as widely followed because of the time limitations faced by constructors. Therefore, flooring substrates, such as concrete slabs, often are not given sufficient time to naturally dry prior to installation of floor covering materials and coatings. Because floor coverings are often adhered using water based adhesive systems to a water-based product, such as concrete, the excessive moisture from the insufficiently dried concrete will likely interfere with the adhesive's ability to bond or cure properly and perpetually.

The concept of curing concrete is often mistaken for the process of drying. Drying is the process of evacuating all of the excess water in the mixture, for example, water that is not used to hydrate cement into a glue. In contrast, curing is directed to chemical reactions that turn raw ingredients of a mixture into a man-made agglomerate rock. Curing can result in increased strength and density of a slab compared to other methods. There are various methods of curing that can be used. For example, some methods can maintain the presence of mixing water in the concrete during the early hardening period, including ponding or immersion, spraying or fogging, and saturated wet coverings. Methods that accelerate the strength gain of the concrete are also described. This can be achieved by supplying heat and additional moisture to the concrete, for example, live steam, heating coils, or electrically heated forms or pads. Other methods described prevent the loss of mixing water from the concrete by sealing the surface of the concrete with impervious paper or plastic sheets, or by applying membrane-forming curing compounds. The sealing of the surface is the most commonly used method.

A known method of sealing the surface is the use of two-part epoxy based or water based sealers. Both of the two-part epoxy and the water based sealers require pre-mixing before application, which can result in improper mixing of the components and therefore job failures, or require up to several days of curing before the sealer is fit for application.

Another problem that can be caused by moisture traveling through a slab is related to the minerals and other materials that can become dissolved therein. This can lead to the leaching of materials, such as alkaline materials from the slab, which can concentrate at the surface. This can affect the pH at the surface and can adversely impact the effectiveness of various adhesives.

Accordingly, it is desirable to provide a product and method for controlling the moisture of a flooring substrate that overcomes the shortcomings of the available products and methods.

SUMMARY OF THE INVENTION

Generally speaking, in accordance with the invention, a composition and method which exhibits enhanced moisture sealing properties, suitable for use with flooring materials, such as concrete, and flooring installations, such as carpeting, wood, tiles, etc. are provided. The composition is preferably non-water-based and can form a non-aqueous barrier coating on the flooring substrate, and most preferably provides a desirable pH and blocks migration of alkaline salts through the substrate.

Systems in accordance with the invention can provide, with preferably a one-coat application, a one-part, reactive, cross-linking multi-functional moisture sealer that can be applicable for most, if not all, flooring installations. Compositions in accordance with the invention can form a penetrating barrier coating that can chemically anchor into a concrete slab and create a hydrophobic barrier within the concrete. The multi-functionality of the invention includes the cross-linked barrier's ability to prime porous concrete, eliminate dust, and/or neutralize surface alkalinity by forming a non-aqueous barrier coating that provides an acceptable pH level and blocks migration of alkaline salts through the slab. In one embodiment of the invention, the composition comprises anti-microbial agents, to resist the growth of mold, mildew or other fungal or bacterial activity.

Compositions in accordance with the invention are particularly well suited to be used in conjunction with an adhesive, such as those disclosed in U.S. Pat. No. 6,706,789, the contents of which are incorporated by reference. Such adhesive preferably comprises drying oils and/or similarly acting polymers, co-polymers, and fatty acids; hydrocarbon resins preferably dissolved or otherwise mixed in the drying oils, particularly cross-linkable hydrocarbons having a melting point in the range 70° C. to 140° C.; dispersing agents, such as salts of polyacrylic acids; dryers, preferably metal naphthanates; fugitive alkali agents, such as ammonia, monomethanol amine (MEA) and triethanol amine (TEA); fugitive anti-oxidant agents; and cross linking agents preferably with pendant oxazoline groups, such as latex polymer solutions and emulsions which include those groups.

A sealer composition in accordance with the invention preferably comprises: oils, such as various drying oils and similarly acting polymers, co-polymers, and fatty acids. The composition can also include various hydrocarbon resins preferably dissolved or otherwise mixed with the oils. Examples of preferred drying oils include Linseed Oil, Tung Oil, Sunflower Oil, Cashew Shell Oil, Castor Oil, Coconut Oil, Cotton Seed Oil, Fish Oil, Oiticica Oil, Rapeseed Oil, Safflower Oil, Sesame Oil, Soybean Oil, Walnut Oil, Synthetic Drying Oils, Tall Oil, Fatty Acids, and/or any blend thereof.

The various hydrocarbon resins preferably include hydrocarbons having a melting (softening) point in the range 70° C. to 140° C. For example, C-5 hydrocarbon resins formed from hydrocarbons having an average of about five carbon atoms and C-9 hydrocarbon resins formed of hydrocarbons having an average of about 9 carbon atoms and preferably both, mixed in effective proportions to provide desired cured strength, green strength, open working times and so forth can be satisfactory. Examples of preferred hydrocarbon resins include aliphatic C-5 hydrocarbon resin with a softening point of between about 75° and 115° C., such as that produced from acyclic aliphatic monomers such as Cis 1,3 pentadiene; trans 1,3 pentadiene; 2-methyl 2 butene; dicyclopentadiene copolymers and vinyl toluene copolymers. Preferred hydrocarbon resins can also include alkylated aromatic C-9 resin with a softening point of between about 100° and 140° C., produced from C-8 to C-10 monomers such as styrene, vinyl toluene, indene, methyl indene and alpha methyl styrene. Alternatively, the hydrocarbon resins can include naturally occurring resins such as gum rosins with a softening point of between about 75° and 100° C. Another example of a preferred hydrocarbon resin includes gum rosins and modified gum rosins, preferably having a softening point of between about 75° to 100° C.

The composition preferably also comprises one or more drying agents to speed up the drying process, one or more dispersing agents, one or more fillers, preferably an inorganic filler, one or more adhesive promoting agents and one or more stabilizing agents. The preferred drying agents comprise naphthanates of one or more metals, the preferred dispersing agents comprise salts of polyacrylic acids, and the preferred inorganic fillers include silica and/or kaolin clays. More preferably, the metals include cobalt, calcium, zirconium and manganese, and stabilizing agents preferably comprise anti-oxidants. A preferred drying agent is moisture-activated driers, such as Hydro-cure® P.I. Drier, manufactured by OM Group, Inc., an Ohio corporation, which can be incorporated directly into the sealer.

Moisture-activated driers release oxygen when comes to contact with moisture. Therefore, when the sealer is applied on a concrete slab, it comes into contact with moisture in the concrete slab, thereby activating the moisture-activated drier to release oxygen, which in turn activates the curing process of the sealer. Because the moisture-activated driers activate curing the sealer on contact with the concrete slab, it provides a relatively fast drying time.

Methods in accordance with the invention involve applying the compositions discussed herein to be used as a sealer on a flooring substrate, such as concrete. An adhesive can then be applied on the surface of the sealer, and a flooring installation, such as wood, tiles, carpeting, etc. can be installed on the surface of the adhesive. Preferably, the sealer and adhesive can bond together to form a continuous adhesive waterproof barrier between the flooring substrate and the flooring installation.

Formulations in accordance with the invention permit the application of floor covering over concrete slabs much easier in the construction process. Thus, sealer formulations in accordance with the invention can be applied to concrete slabs that are not fully dry. For example, the sealer can be applied to slabs with a moisture vapor transmission (MVT) rate of up to about 15 lbs per 1000 sq. ft. per 24 hours, and under certain circumstances, even higher. Most preferably, the sealer is applied to slabs with an MVT rate of about 12 lbs per 1000 sq. ft. per 24 hours.

A preferred embodiment of the invention comprises a blend having 100 parts by weight of dry solids, about 2–10 parts hydrocarbon resin, about 40–80 parts drying oil, and about 0.005–0.01 parts metal naphthanates.

Preferred resins include aliphatic C-5 hydrocarbon resin, for example, those produced from acyclic aliphatic monomers such as Cis 1,3 Pentadiene; Trans 1,3 Pentadiene; 2-Methyl 2 Butene; Dicyclopentadiene Copolymers; Vinyl toluene Copolymers; and alkylated aromatic C-9 resin, for example, those produced from C-8 to C-10 monomers such as Styrene, Vinyl Toluene, Indene, Methyl Indene, Alpha Methyl Styrene.

Preferred drying oils include Linseed Oil, Tung Oil, Sunflower Oil, Cashew Shell Oil, Castor Oil, Coconut Oil, Cotton Seed Oil, Fish Oil, Oiticica Oil, Rapeseed Oil, Safflower Oil, Sesame Oil, Soybean Oil, Walnut Oil, Synthetic Drying Oils, Tall Oil, Fatty Acids, or any blend of the above.

Preferred metal naphthanates include cobalt naphthanates, calcium naphthanates, zirconium naphthanates, and/or manganese naphthanates. Examples of preferred drying agents include moisture activated driers such as Hydrocure® PI.

Accordingly, it is an objective of the invention to provide a composition and method that can address moisture emission through concrete, particularly one suitable for use with a flooring substrate.

Still other objects and advantages of the invention will in part be obvious and will in part be apparent from the specification and drawings.

The invention accordingly comprises the several steps and the relation of one or more of such steps with respect to each of the others, and the composition possessing the features, properties, and the relation of constituents (components), which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is a chart comparing the moisture emission rate of unsealed concrete and a concrete slab sealed using a composition and method in accordance with the invention.

DETAILED DESCRIPTION OF THE PREFERRED EMBODIMENTS

Figure 1:
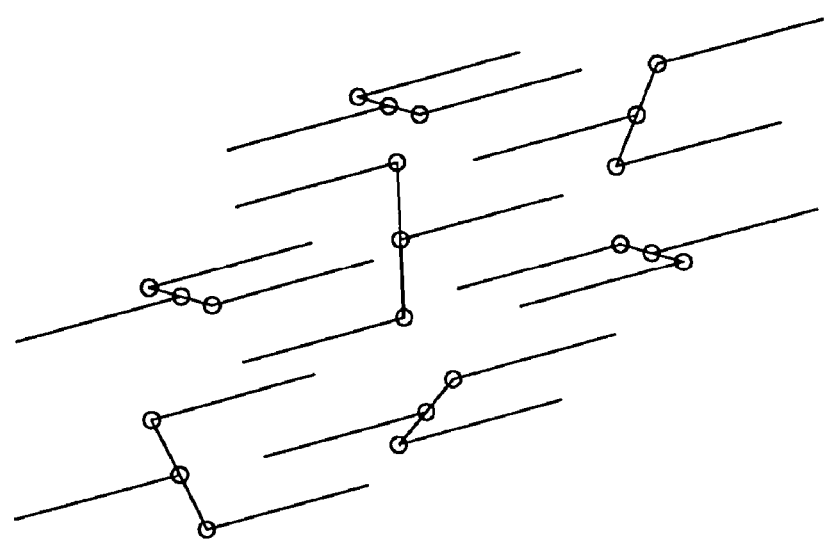
FIG. 1 is a schematic drawing of a composition in an unsaturated non-cross-linked stage of a composition in accordance with an embodiment of the invention.

The invention is directed to compositions, methods and systems for controlling moisture levels in substrates, such as flooring substrates. Compositions in accordance with the invention are preferably suitable for use as a coating or sealer for a flooring substrate, such as concrete, most suitable for porous concrete. As will be evident to those of ordinary skill in the art, substitutions, omissions and additions will be possible in order to provide a composition suitable for use as a coating or sealer with customized selected properties.

Preferred ingredients and preferred composition in parts by weight in accordance with preferred embodiments of the invention are set forth below in Table 1.

TABLE 1

| | Preferred Ingredient | Preferred Amount parts by wt. |
|---|---|---|
| 1 | Drying Oils such as Linseed Oil, Tung Oil, Sunflower Oil, Cashew Shell Oil, Castor Oil, Coconut Oil, Cotton Seed Oil, Fish Oil, Oiticica Oil, Rapeseed Oil, Safflower Oil, Sesame Oil, Soybean Oil, Walnut Oil, Synthetic Drying Oils, Tall Oil, Fatty Acids, or any blend of the above. | 40 to 80 |

TABLE 1-continued

| | Preferred Ingredient | Preferred Amount parts by wt. |
|---|---|---|
| 2 | Aliphatic C-5 Hydrocarbon Resin with a softening point of between about 75° and 115° C., such as that produced from Acyclic Aliphatic monomers such as Cis 1, 3 Pentadiene, Trans 1, 3 Pentadiene, 2-Methyl 2 Butene, Dicyclopentadiene Copolymers, Vinyl toluene Copolymers | 2 to 10 |
| 3 | Alkylated Aromatic C-9 Resin with a softening point of between about 100° and 140° C., produced from C-8 to C-10 monomers such as Styrene, Vinyl Toluene, Indene, Methyl Indene, Alpha Methyl Styrene; or naturally occurring resins such as gum rosins with a softening point of between about 75° and 100° C. | 2 to 10 |
| 4 | Stabilizing Agents, for example, Fugitive anti-oxidants such as oximes such as methyl ethyl ketoxime, Bactericide, Fungicides, and Freeze-Thaw Stabilizers | 0.005 to 0.010 |
| 5 | Adhesive promoting agents, preferably comprising silanes | 0.005 to 0.010 |
| 6 | Drying agents, preferably Naphthanates of metals such as cobalt, calcium, zirconium, and manganese, or moisture-activated driers | 0.005 to 0.010 |
| 7 | Dispersing agents, preferably salts of polyacrylic acids | 0.005 to 0.010 |
| 8 | Inorganic Fillers such as Calcium Carbonate, Kaolin Clay, Mica, Talc, Silica, etc. | 2 to 10 |

A composition in accordance with the invention can comprise oils, preferably drying or semi-drying oils, such as such as various drying and semi-drying oils and similarly acting polymers, co-polymers, and fatty acids. Examples of oils that can be used include Linseed Oil, Tung Oil, Sunflower Oil, Cashew Shell Oil, Castor Oil, Coconut Oil, Cotton Seed Oil, Fish Oil, Oiticica Oil, Rapeseed Oil, Safflower Oil, Sesame Oil, Soybean Oil, Walnut Oil, Synthetic Drying Oils, Tall Oil, Fatty Acids, or any blend of the above.

A composition in accordance with the invention can also comprise resins, preferably hydrocarbon resin, which can be mixed, preferably dissolved, in the drying oils. Some examples of preferred resins include a resin formed with relatively soft resins having, on average, 6 or fewer carbon atoms and a softening point preferably between 75° C. and 115° C. combined with a relatively harder resin formed from hydrocarbons having an average of 7 or more carbon atoms and a softening point preferably about between 100° C. and 140° C. Another example of preferred resins include naturally occurring resins such as gum rosins or modified gum rosins with a softening point of between about 75° and 100° C.

In accordance with an embodiment of the invention, the composition can also comprise a surface smoothing additive, such as additives that reduce the surface tension of the sealer. Preferably, the surface smoothing additive substantially prevents the formation of Benard cells (floating), thereby providing a more smooth and even surface, increasing surface slip, leveling and gloss of the sealer. These surface smoothing additives can also improve substrate wetting and provide anti-blocking properties. The surface smoothing additives can include one or more of but is not limited to silicone additives, acrylates, nanomaterial, fluorosurfactants, aromatics, ketones, polysiloxanes and alkoxylates. Examples of suitable nanomaterial include alumina ceramic nanoparticles.

Acceptable surface smoothing additives include those sold under the trademarks BYK® and Byketol®, and Nano-byk, manufactured by BYK-Chemie GmbH, a German corporation.

In preferred embodiments of the invention, the relatively soft resin can be an aliphatic hydrocarbon resin formed of hydrocarbons having an average of about 5 carbon atoms, for example, acyclic aliphatic monomers, such as cis 1,3 pentadiene, trans 1,3 pentadiene, and 2-methyl 2 butene and cyclopentadienes. The relatively harder resin can be alkylated aromatic resins, particularly those formed from hydrocarbons having an average of 8 to 10 carbon atoms, such as those produced from C-8, C-9 and C-10 monomers, such as styrene, vinyl toluene, indene, methyl indene, alpha methyl styrene. Preferred C-9 resins include petroleum aromatic hydrocarbon resins having softening points in the range 100° C. to 135° C. Alternatively, other non-limiting examples of suitable C-9 and C-5 Resins are described below in Table 2.

TABLE 2

| Manufacturer | C-9 Resins | C-5 Resins |
| --- | --- | --- |
| Rutgers VFT AG<br>Varziner Strasse 49, D-47138<br>Duisburg Germany | Novares TT120<br>Novares TT130 | |
| Sartomer Company<br>Oaklands Corporate Center<br>502 Thomas Jones Way<br>Exton, PA 19341 | Norsolene S115,<br>Norsolene S125,<br>Norsolene S135 | |
| Exxon Chemicals<br>Houston<br>2401 S. Gessner<br>Houston, TX 77063-2005, USA | | Escorez 1102<br>Escorez 1304<br>Escorez 1310LC<br>Escorez 1315<br>Escorez 1580 |
| Neville Chemical Company<br>2800 Neville Road<br>Pittsburgh, PA 15225 | Nevchem 110<br>Nevchem 120<br>Nevchem 130<br>Nevex 100 | Lx-1200<br>Lx-1200-130<br>Lx-2600-125 |
| Eastman Chemical Company<br>P.O. Box 431 Kingsport,<br>TN 37662 | Petrorez 100<br>Petrorez 199<br>Petrorez 200 | |
| Resinall<br>3065 High Ridge Road<br>P.O. Box 8149<br>Stamford CT 06903 | Resinall 711<br>Resinall 717<br>Resinall 736<br>Resinall 737<br>Resinall 747<br>Resinall 771<br>Resinall 774 | Resinall 769 |
| TOSOH Corporation<br>Suite 600, 1100 Circle<br>75 Parkway, Atlanta, GA<br>30339-3097,<br>U.S.A. | Petcoal ® 100<br>Petcoal ® 120<br>Petcoal ® 120HV<br>Petcoal ® 140 | |
| Arakawa CHEMICAL (USA) INC.<br>625 N. Michigan Avenue -<br>Suite #1700<br>Chicago, IL 60611 USA | Arkon SM-10<br>Arkon SP10 | |
| Grenhall Chemicals Limited<br>7686 Bath Road,<br>Mississauga, ON Canada L4T 1L2 | Resin GC100,<br>Resin GC300,<br>Resin GC400 | |
| Hercules Inc.<br>Resins Division<br>Hercules Plaza<br>1313 North Market Street<br>Wilmington, DE 19894 | Picco 5120<br>Picco 6115 | Piccotac 115<br>Piccotac B |
| Yuen Liang Industrial Co., Ltd<br>South Korea | Petroresin (yl-series,<br>sk-series, gs-series<br>b-series with<br>softening point<br>of between<br>90–130° C. | |
| Sunbelt Chemicals, Inc.<br>407 N. Cedar Ridge, Suite 230<br>Duncanville, Texas 75116 | SB1000<br>SB1100<br>SB140ES | R100AS<br>S105A<br>R100G |
| LUKOIL Bulgaria<br>Bulgaira<br>1421 Sofia,<br>59 A Cherni Vrah Blvd | PYROLEN 100 | |

The composition in accordance with the invention preferably also includes any or all of a combination of dispersing agents, such as salts of polyacrylic acids and dryers, preferably moisture-activated driers or metal naphthanates, an inorganic filler, preferably silica, adhesive promoting agents, and/or stabilizing agents. The metal naphthanates preferably comprise cobalt naphthanates, calcium naphthanates, zirconium naphthanates, and/or manganese naphthanates. The adhesive promoting agents preferably comprise silanes or other agents that are compatible with the drying oil of choice, and the stabilizing agents preferably comprise anti-oxidants, more preferably fugitive anti-oxidants. The fugitive anti-oxidants can include oximes, such as methyl ethyl ketoxime. Alternatively, the stabilizing agents can comprise bactericides, fungicides and/or freeze/thaws stabilizers.

A preferred embodiment of the composition in accordance with the invention comprises an antimicrobial agent capable of protecting the composition from the multiplication of bacteria and fungi in the wet and the dry state. Acceptable antimicrobial agents include those sold under the trademark Taylor's Meta-Sept™, by W.F. Taylor Co. of Fontana, Calif.

In accordance with a preferred embodiment of the invention, the composition can further comprise a surface smoothing additive, for example, an additive comprising one or more of silicone, acrylates, polysiloxanes, alkoxylates, nanomaterials, etc. The surface smoothing additive preferably substantially prevents the formation of Bénard (floating) cells, craters and the like, to provide a smooth sealer surface.

A preferred embodiment of the composition in accordance with the invention is non-water-based and does not contain more than a negligible amount of epoxy, requires no mixing, is non-hazardous and can be used on flooring substrates such as concrete slabs on or above grade at moisture levels up to 12 lbs. per 1000 sq. ft. per 24 hrs. A single coat application of the composition should be able to reduce moisture emission from up to 12 lbs per 1000 sq. ft. per 24 hrs. to less than 3 lbs per 1000 sq. ft. per 24 hrs.

According to an embodiment of the invention, the composition can comprise a blend comprising approximately 100 parts by weight of preferably about 2 to 10 parts inorganic fillers, preferably comprising silica, about 0.005 to 0.010 parts adhesive promoting agents and about 0.005 to 0.010 parts stabilizing agents; 2–10 parts hydrocarbon resin; 40–80 parts drying oil; 0.005–0.01 parts dispersing agents and 0.005–0.01 parts drying agents.

Preferably, after being applied on the substrate, the composition can be a permanently cross-linked, barrier primer coating, upon which an adhesive for flooring installation can be applied. The composition can preferably prime porous concrete and eliminate dust, neutralize surface alkalinity by forming a non-aqueous barrier coating that provides an acceptable pH level by blocking migration of alkaline salts through the slab onto the flooring installation.

The composition preferably can cure within 24 hours, by chemically cross-linking to form a hard, impervious sealer that penetrates into the concrete. In a preferred embodiment of the invention, the composition can form a smooth and dust free surface on which to install the flooring within 24 hours from a single coat application.

Although employing the methods and materials in accordance with the invention does not depend on knowing the precise science behind the various relevant reactions, the process for curing a sealer in accordance with the invention is believed to proceed as follows. There have been numerous studies of the curing process, particularly of drying oil films. A substantial portion of these studies focus on relatively simple systems that were kept at different conditions of light, temperature and humidity. According to some of these studies, the initial stage of the drying oil can be a viscous liquid composed of a complex mixture of highly unsaturated non-cross-linked drying oil. FIG. 1 shows a schematic diagram of such a drying oil in the initial stage.

Figure 2:
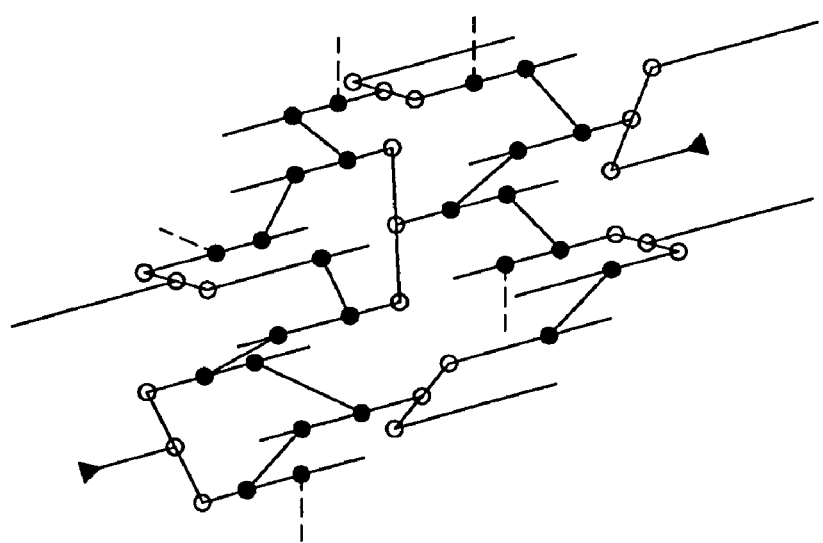
FIG. 2 is a schematic drawing of a composition in a partially cross-linked stage of a composition in accordance with an embodiment of the invention.

FIG. 2 shows the drying oil of FIG. 1 after the induction period when oxygen is introduced, whereupon hydroperoxides form due to autoxidation. There is also a shift of at least some of the non-conjugated cis double bonds to a system containing conjugated trans-cis double bonds. These phenomena can be observed using ATR (Attenuated Total Reflectance) and/or photoacoustic—FTIR (Fourier Transform InfraRed) spectroscopy. As the hydroperoxides form and the non-conjugated cis double bonds shift to conjugated trans-cis double bonds, the number of number double bonds in the substance, represented by its iodine value, decreases. The iodine value can be observed by using NMR (Nuclear Magnetic Resonance) spectroscopy.

Figure 3:
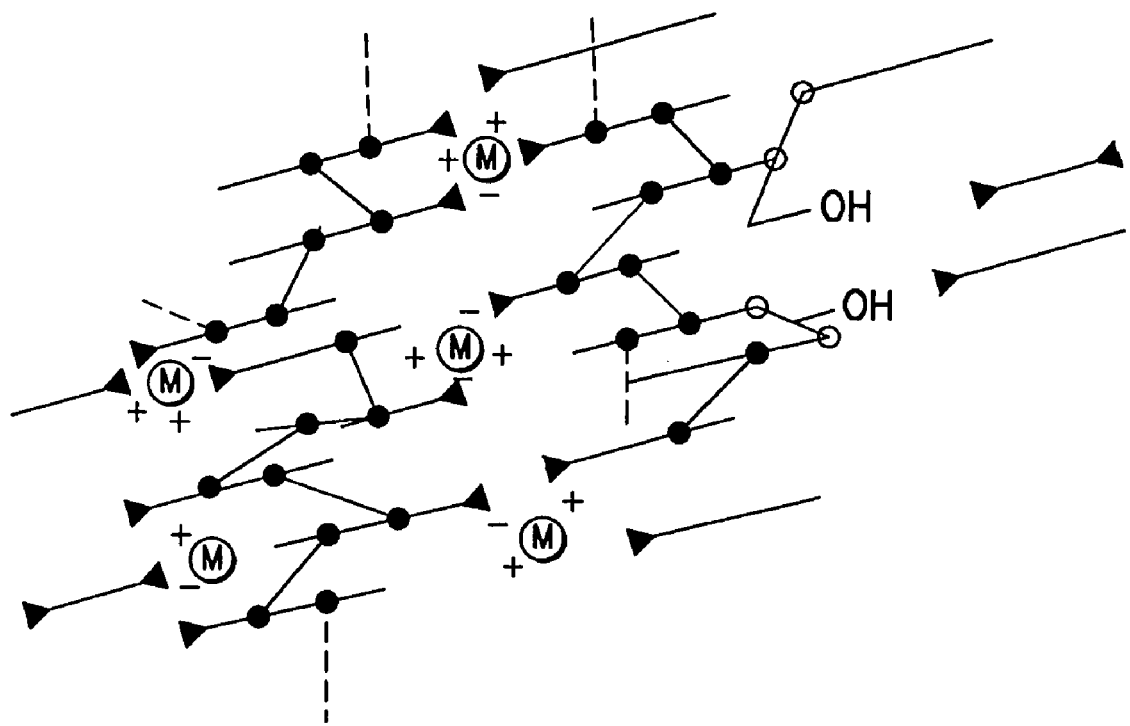
FIG. 3 is a schematic drawing of a composition in a fully cross-linked stage of a composition in accordance with an embodiment of the invention.

The incorporation of oxygen, which preferably occurs initially on the surface of the composition, can result in the increase in the mass of the sealer, which can be accountable to the formation of hydroperoxides when the oxygen is being added. Whereas initially, the amount of peroxide rapidly increases, it eventually decreases, as the hydroperoxides decompose. Therefore, the concentration of free radicals can increase, thereby contributing, preferably substantially, to the cross-linking of the drying oil mixture. Preferably the sealer can maintain its mass. The drying oil mixture can preferably cross-link to itself and to the adhesive and form a more viscous, gel like material. Cross-linking agents in the adhesive, preferably an oxazoline, preferably reacts with carboxyl groups in both the adhesive and the sealer. The sealer preferably comprises drying oils comprising carboxyl groups to allow cross-linking to occur. The cross-links can comprise C(=O)—O—C, C(=O)—C and/or C—C bonds, and a compound having a higher molecular weight can be formed. FIG. 3 shows a composition that is fully cross-linked and can represent both the adhesive as well as the sealer.

The cured sealer as shown in FIG. 3 preferably comprises greater values of carboxyl and/or hydroxyl groups, and their respective IR spectra signals preferably are broadened. Preferably, the acidic value of the composition increases when it is cured, which may be attributable mostly to the formation of breakdown products, such as hydroperoxides, rather than the rapid increase in the hydrolytic processes, which is a known process for the producing carboxylic acid functionality. An increase in hydrolytic processes can result in the increased formation of free fatty acids, which can alter the acidic value and enhance the rate of oxidation. Therefore, whereas it is not the primary cause of increase of acidic value, the rapid increase in the hydrolytic processes plays a role.

In a preferred embodiment of the invention, the composition is initially soluble in solvents, for example, hexane and/or solvents comprising mineral salts, such as a paint thinner, for example, white spirit (mineral spirit). When the composition is dried, however, it preferably becomes substantially insoluble. The solubility fraction of a composition in accordance with an embodiment of the invention has been analyzed using SEC (size-exclusion chromatography), which revealed the formation of higher molecular weight materials, such as pentamers, as well as lower molecular weight products.

According to an embodiment of the invention, the composition can cover between 350–400 sq. ft. per gallon, preferably in a one-coat application, and can roll on with a relatively short nap paint roller. The composition preferably can effectively block residual construction moisture, thereby enabling faster flooring installation and project completion. The embodiment of the composition can reduce moisture transmission levels from 12 lbs. per 1000 sq. ft. per 24 hrs to 3 lbs. per 1000 sq. ft. per 24 hrs within 48 hours, preferably between 20–24 hours.

Accordingly, in one embodiment of the invention, a concrete slab is constructed. Before the concrete is permitted to dry to a moisture vapor transmission level of, for example, about 3 lbs. per 1000 sq. ft. per 24 hrs., the sealer in accordance with the invention is applied. It is preferred that the surface of the concrete be clean to promote better absorption of the sealer. Dye can also be added to assist with the visual observation of the application. Smooth, thin applications are preferred and puddling should be avoided. Depending on various circumstances and formulations, the sealer can be applied at various stages in the construction process. In one embodiment of the invention, the slab should be tested via ASTM F-1869-98 to determine MVT levels. In one embodiment of the invention, once those levels decrease to about 15 lbs. (more preferably 12 lbs.) per 1000 sq. ft. per 24 hrs., the sealer can be applied. Thus, applications can occur at MVT levels of over about 6 or 9 lbs. per sq. ft. per 24 hrs. The sealer is then permitted to cure, typically about 10–12 hours, and then a flooring adhesive such as Taylor Meta-Tec® can be used to apply flooring material.

Although not necessarily fully understood, one possible explanation for the composition's ability to block moisture is the cross-linking reactions of the drying oils catalyzed by the metal naphthanates (driers), which preferably occurs during the curing process. The reaction between the drying oils and the metal naphthanates is preferably initially blocked by the stabilizing agents, preferably anti-oxidants, and preferably only proceeds when drying. By mixing the resins in the oils, such as drying oils, with the stabilizing agents, such as anti-oxidants, the resins can be prevented from cross-linking until the drying oil is exposed to air, whereupon it can begin to harden. For example, anti-oxidants, preferably comprised in the stabilizing agents, can block the oxidation reaction. When the composition is exposed to air, it can begin to dry and harden, and the anti-oxidant can begin to evaporate, which preferably triggers the oxidation reaction in the presence of oxygen and the resins can begin to cross-link. Preferably, there is sufficient anti-oxidant to prevent the composition from cross-linking and therefore curing too quickly and to provide sufficient open time and ease of handling.

The invention is also directed toward a method of controlling moisture for the purposes of substantially avoiding flooring problems that are associated with moisture, such as excess moisture emission. According to an embodiment of the invention, one method comprises applying at least a layer of a coating or sealer comprising hydrocarbon resin dissolved in a drying oil, metal naphthanates, dispersing agents, silica, adhesive promoting agents, and/or stabilizing agents on the flooring substrate. The metal naphthanates preferably comprise cobalt naphthanates, calcium naphthanates, zirconium naphthanates, and/or manganese naphthanates. The dispersing agents preferably comprise salts of polyacrylic acids, the adhesive promoting agents preferably comprise silanes, and the stabilizing agents preferably comprise anti-oxidants and the flooring substrate preferably is concrete. The sealer preferably can reduce the moisture level of the concrete slab to a predetermined desirable level.

A compatible adhesive that is suitable for use with the flooring installation is preferably determined and applied on the slab coated with the sealer. The preferred adhesives include those sold under the trademark Taylor Meta-Tec™, sold by W.F. Taylor Co. of Fontana, Calif., as described in U.S. Pat. No. 6,706,789. Examples of preferred adhesives are provided below in Table 3. The adhesives preferably comprise a hydrocarbon resin dissolved in a drying oil, a fugitive alkali agent and a cross-linking agent is used. The application of the composition in combination with the preferred adhesives can help overcome the problems such as peeling, bubbling and/or detaching from the floor, which usually occur later in the lifetime of the flooring installation.

TABLE 3

Preferred TAYLOR META-TEC ® Adhesives

| Product | Adhesive Description |
|---|---|
| | Meta-Tec ® Wood Flooring Adhesive |
| 2071 | TUFF-LOK X-LINK Wood Flooring Adhesive |
| | Meta-Tec ® Carpet Adhesives |
| 2081 | TUFF-LOK X-LINK Carpet Adhesive |
| 2082 | TUFF-LOK X-LINK Carpet Tile Adhesive |
| 2089 | TUFF-LOK X-LINK Outdoor Carpet Adhesive |
| | Meta-Tec ® Resilient Flooring Adhesives |
| 2083 | TUFF-LOK X-LINK VCT Adhesive |
| 2084 | TUFF-LOK X-LINK Linoleum Adhesive |
| 2086 | TUFF-LOK X-LINK Cork Flooring Adhesive |
| 2091 | TUFF-GRIP TPS Pressure Sensitive Luxury Vinyl Tile and Plank Adhesive |
| 2092 | META-POXY X-LINK - One Part Vinyl & Rubber Tile, Tread, and Sheet Goods Adhesive |
| 2096 | META-POXY X-LINK - One Part - ESD - Conductive and Dissipative Vinyl Tile Adhesive |
| 2097 | TUFF-LOK X-LINK Commercial Sheet Goods Adhesive |

The adhesive preferably provides strong, waterproof bonds that can form strong bonds to the flooring. The waterproof bonds can preferably cross-link with the sealer surface to form a continuous waterproof barrier, which therein can provide a more effective and durable flooring protection. Preferably, the barrier comprises any one or a combination of C(=O)—O—C, C(=O)—C and/or C—C bonds.

Epoxy films, a commonly used sealer, lay on top of the concrete, adhering to its surface, whereas the composition in accordance with an embodiment of the invention can penetrate and latch to the pores in the surface of the concrete. Under adverse conditions, it is more likely for a topical film, such as epoxy, to peel, bubble and detach from the surface, becoming a "floating layer", which can lead to more problems with adhesive application and installation. The composition, on the other hand, can allow a degree of acceptable moisture transmission and further can lock deeply into the concrete surface, and therefore is less likely to be adversely affected under the same conditions of moisture and vapor pressure as the epoxy film.

Another potential benefit of the composition in accordance with an embodiment of the invention is that a large area may be covered in one day, requiring only a one-coat application. Depending on the jobsite conditions, a composition in accordance with an embodiment of the invention can be hard and tack free to walk on within 10–24 hours of application. The flooring slab upon which the composition is applied may be ready for flooring installation within 24 hours. The composition can be used with new and refurbishment projects.

It will thus be seen that the objects set forth above, among those made apparent from the preceding description, are efficiently attained, and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

Particularly it is to be understood that in said claims, ingredients or compounds recited in the singular are intended to include compatible mixtures of such ingredients wherever the sense permits.

The invention claimed is:

1. A construction method, comprising:
    forming a concrete surface;
    permitting the surface to dry to a moisture transmission rate of over about 3 lbs per 1000 sq. ft. per 24 hours;
    applying a sealer over the surface, the sealer comprising a reactive, cross-linking, hydrocarbon based liquid;
    permitting the sealer to cure;
    applying a flooring adhesive over the sealer; and
    adhering flooring material to the adhesive.

2. The method of claim 1, wherein the concrete has a moisture transmission rate of over about 6 lbs. per 1000 sq. ft. per 24 hrs. when the sealer is applied.

3. The method of claim 1, wherein the concrete has a moisture transmission rate of no more than about 12 lbs. per 1000 sq. ft. per 24 hrs. when the sealer is applied.

4. The method of claim 1, wherein the sealer is formed by combining materials comprising drying oils, semi-drying oils or similarly acting polymers, copolymers or fatty acids; stabilizing agents; and drying agents.

5. The method of claim 1, wherein the sealer is formed by combining oximes and metal naphthanates.

6. A method of controlling moisture in surface material, comprising applying on a surface of a not fully dried material, a composition or the combination resulting from the addition of components, comprising:
    one or more oils;
    one or more hydrocarbon resins;
    one or more stabilizing agents;
    one or more drying agents;
    one or more dispersing agents; and
    one or more fillers to provide a water transfer barrier over the surface.

7. The method of claim 6, comprising applying on a surface of a not fully dried material, a formulation resulting from the combination of components, comprising:
    40 to 80 parts by weight of one or more drying oils,
    2 to 10 parts by weight of one or more aliphatic hydrocarbon resins comprising five carbons and a softening point of between about 75° and 115° C.;

2 to 10 parts by weight of one or more alkylated aromatic hydrocarbon resins comprising nine carbons and a softening point of between about 100° and 140° C.;

0.005 to 0.010 parts by weight of one or more stabilizing agents comprising one or more anti-oxidants;

0.005 to 0.010 parts by weight of one or more drying agents comprising metal naphthanates;

0.005 to 0.010 parts by weight of one or more adhesive promoting agents comprising one or more silanes;

0.005 to 0.010 parts by weight of one or mare dispersing agents; and 2 to 10 parts by weight of one or more inorganic fillers.

8. The method claim 6, wherein the one or more resins comprise at least one acyclic aliphatic monomer from a group comprising cis 1,3 pentadiene, trans 1,3 pentadiene, 2-methyl 2 butene, dicyclopentadiene copolymers, vinyl toluene copolymers; and one petroleum aromatic hydrocarbon resin having a softening of between 100° to 135° C.;

the one or more stabilizing agents comprise oxime;

the one or more drying agents comprise at least one of a moisture-activated drier, a cobalt naphthanate, a calcium naphthanate, a zirconium naphthanate, and/or a manganese naphthanate;

the one or more dispersing agents comprise one or more salts of polyacrylic acids; and the one or more inorganic fillers comprise silica.

9. The method of claim 6, wherein the formulation further comprises one or more surface smoothing additives.

10. The method of claim 9, wherein the one or more surface smoothing additives comprise silicone, acrylates, alkoxylates, polysiloxane, and/or alumina ceramic nanoparticles.

11. The method of claim 6, wherein the formulation is contained in a container and the container is associated with instructions describing the application of the formulation to a concrete slab that has not fully dried, to reduce the moisture transmission rate of the slab to permit the application of adhesive prior to full drying of the slab.

12. A method of controlling moisture in surface material, comprising applying on a surface of a not fully dried material, a one-part, reactive cross-linking moisture barrier formulation resulting from the combination of components, comprising one or more oils, one or more hydrocarbon resins, and one or more stabilizing agents; wherein the formulation will form a non-aqueous adhesive compatible moisture barrier over a non-dried concrete substrate and limit moisture transmission levels through the barrier to not more than 3 lbs per 1000 sq. ft. per 24 hours from an initial moisture transmission level of about 12 lbs per 1000 sq. ft. per 24 hours within 48 hours.

13. The method of claim 12, wherein the formulation further comprises one or more drying agents.

14. The method of claim 12, wherein the formulation further comprises one or more adhesive promoting agents.

15. The method of claim 12, wherein the formulation further comprises one or more dispersing agents.

16. The method of claim 12, wherein the formulation further comprises one or more fillers.

17. The method of claim 12, wherein the one or more oils comprise drying oils, semi-drying oils, and/or similarly acting polymers, co-polymers and/or fatty acids.

18. The method of claim 12, wherein the oils comprise linseed oil, tung oil, sunflower oil, cashew shell oil, castor oil, coconut oil, cotton seed oil, fish oil, oiticica oil, rapeseed oil, safflower oil, sesame oil, soybean oil, walnut oil, synthetic drying oils, tall oil, fatty acids, or a blend of thereof.

19. The method of claim 12, wherein the one or more hydrocarbon resins comprise at least one hydrocarbon resin having six or fewer carbon atoms.

20. The method of claim 19, wherein the one or more hydrocarbon resins comprise at least one hydrocarbon resin having a softening point of between 70° and 115° C.

21. The method of claim 19, wherein the one or more hydrocarbon resins comprise at least one aliphatic hydrocarbon resin.

22. The method of claim 21, wherein the one or more hydrocarbon resins comprise acyclic aliphatic monomers, cis 1,3 pentadiene, trans 1,3 pentadiene, 2-methyl 2-butene, vinyl toluene and/or cyclopentadiene.

23. The method of claim 12, wherein the one or more hydrocarbon resins comprise at least one hydrocarbon resin having seven or more carbon atoms.

24. The method of claim 23, wherein the one or more hydrocarbon resins comprise at least one hydrocarbon resin having a softening point of between 100° and 140° C.

25. The method of claim 23, wherein the one or mare hydrocarbon resins comprise at least one alkylated aromatic resin.

26. The method of claim 25, wherein the one or more hydrocarbon resins comprise styrene, vinyl toluene, indene, methyl indene and/or alpha methyl styrene.

27. The method of claim 12, wherein the one or more hydrocarbon resins comprise at least one petroleum aromatic hydrocarbon resin having a softening point in the range of 100° to 135° C.

28. The method of claim 12, wherein the one or more hydrocarbon resins comprise at least one hydrocarbon resin having six or fewer carbon atoms and a softening point of between 70° and 115° C.; and at least one hydrocarbon resin having seven or more carbon atoms and a softening point of between 100° and 140° C.

29. The method of claim 12, wherein the one or more hydrocarbon resins comprise at least one naturally occurring resins.

30. The method of claim 29, wherein the at least one naturally occuring resins comprise gum rosins and/or modified gum rosins.

31. The method of claim 12, wherein the one or more stabilizing agents comprise anti-oxidants.

32. The method of claim 31, wherein the one or more anti-oxidants comprise oximes.

33. The method of claim 12, wherein the one or more stabilizing agents comprise one or more of bactericides, fungicides and/or freeze-thaw stabilizers.

34. The method of claim 13, wherein the one or more drying agents comprise metal naphthanates.

35. The method of claim 13, wherein the one or more drying agents comprise one or more moisture-activated driers.

36. The method of claim 14, wherein the one or more adhesive promoting agents comprise silanes.

37. The method of claim 15, wherein the one or more dispersing agents comprise salts of polyacrylic acids.

38. The method of claim 12, wherein the one or more drying oils comprise 40 to 80 parts by weight of the formulation;

the one or more hydrocarbon resins comprise 2 to 10 parts by weight of the formulation; and the one or more stabilizing agents comprise 0.005 to 0.010 parts by weight of the formulation.

39. The method of claim 12, wherein the formulation can reduce moisture transmission levels from about 12 lbs. per 1000 sq. ft. per 24 hours to about 3 lbs. per 1000 sq. ft. per 24 hours within 24 hours.

40. The method of claim 12, wherein the formulation further comprises one or more surface smoothing additives.

41. The method of claim 40, wherein the one or more surface smoothing additives comprise silicone, acrylates, alkoxylates, polysiloxane, and/or alumina ceramic nanoparticles.

* * * * *